(12) United States Patent
Li et al.

(10) Patent No.: US 7,760,647 B2
(45) Date of Patent: Jul. 20, 2010

(54) OUT OF BAND FLOW CONTROL

(75) Inventors: Pui Li, Los Altos Hills, CA (US); Denis Claveloux, Mason, NH (US); Joel Craig Naumann, Morgan Hill, CA (US); Harsh Singh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 11/614,569

(22) Filed: Dec. 21, 2006

(65) Prior Publication Data

US 2008/0151919 A1    Jun. 26, 2008

(51) Int. Cl.
    *H04L 12/26* (2006.01)
(52) U.S. Cl. .............. 370/236; 370/229; 370/236.1; 370/236.2; 370/230; 370/412
(58) Field of Classification Search .............. 370/229, 370/236, 236.1, 236.2, 230, 412
    See application file for complete search history.

(56) References Cited

U.S. PATENT DOCUMENTS

| | | | |
|---|---|---|---|
| 4,799,215 A * | 1/1989 | Suzuki | 370/236 |
| 6,304,554 B1 * | 10/2001 | Matsumura et al. | 370/236 |
| 6,442,172 B1 * | 8/2002 | Wallner et al. | 370/416 |
| 6,654,342 B1 * | 11/2003 | Dittia et al. | 370/236 |
| 6,667,985 B1 * | 12/2003 | Drummond-Murray | 370/236 |
| 2003/0103450 A1 * | 6/2003 | Chapman et al. | 370/229 |
| 2007/0047535 A1 * | 3/2007 | Varma | 370/360 |

OTHER PUBLICATIONS

Tom Clark, Storage Networking Building Blocks, 3.5.4 802.3x Flow Control, Article, Mar. 8, 2002, pp. 13-14, Addison-Wesley.

\* cited by examiner

*Primary Examiner*—Dang T Ton
*Assistant Examiner*—Robert M Morlan
(74) *Attorney, Agent, or Firm*—Stolowitz Ford Cowger LLP

(57) ABSTRACT

In one embodiment, a flow control module aggregates indications of queuing resource utilization at devices attached to a switching fabric within a router and broadcasts that information out of band to all devices attached to the same switching fabric. When the flow control module identifies congestion at one of the attached devices according to the indications, the module may also cause a throttling of traffic sent to the congested device in addition to sending the out of band indication of the congestion to all the attached devices. Flow control modules for each of the attached devices provide local interrupts for reducing outbound traffic to a congested device according to the identification of that remote congestion.

17 Claims, 6 Drawing Sheets

BACKGROUND

OUT OF BAND FLOW CONTROL

BACKGROUND

Processing devices, such as line cards attached to a router, have finite resources and thus generally include a queuing scheme to queue requests that cannot be immediately processed. As the processing device's queuing memory begins to fill up, the processing device sends a congestion message in band through switching fabric of the router to request a reduced traffic flow. The congestion message is sometimes delayed due to congestion in the switching fabric. When the congestion message is delayed, the processing devices may continue receiving incoming traffic that can fill up the local queuing resources causing a deadlock or packet loss situations within the router.

The deadlock or packet loss situation can lead to an unresponsive router or poor router performance. Designers have attempted to address the above-described deadlock or packet loss situation by increasing queuing resources within each processing device, which reduces the need for congestion messages. However, this partial solution is expensive and does not eliminate deadlocks or packet losses. The disclosure that follows solves this and other problems.

DESCRIPTION OF EXAMPLE EMBODIMENTS

Overview

Figure 1:
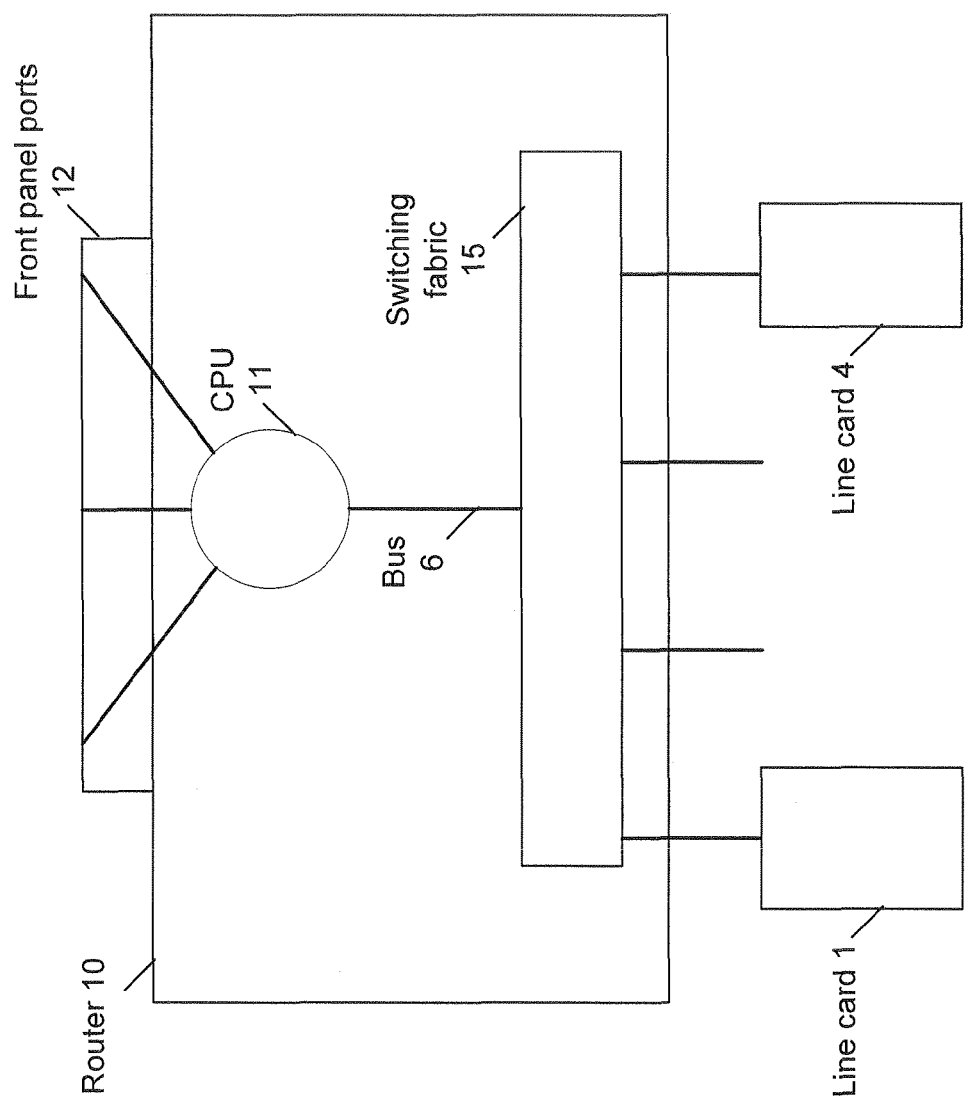
FIG. 1 illustrates an example of a routing device.

In one embodiment, a flow control module aggregates indications of queuing resource utilization at devices attached to a switching fabric within a router and broadcasts that information out of band to all devices attached to the same switching fabric. When the flow control module identifies congestion at one of the attached devices according to the indications, the module may also cause a throttling of traffic sent to the congested device in addition to sending the out of band indication of the congestion to all the attached devices. Flow control modules for each of the attached devices provide local interrupts for reducing outbound traffic to a congested device according to the identification of that remote congestion.

Preferred Examples

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example of a routing device.

Routing devices forward data packets across a packet switched network according to a network address for each data packet. FIG. 1 shows an example of a router 10. The router 10 includes front panel ports 12, a Central Processing Unit (CPU) 111 and switching fabric 15. The router 10 also includes a backplane for connecting modules, such as line cards 1 and 4.

The front panel ports 12 are used to connect the router 10 to a packet switched network, such as the Internet. When receiving packets from the Internet, the CPU 111 examines each packet's IP header, uses a network address to look up the appropriate "next hop", and then forwards a representation of the received packets to the switching fabric 15. CPU 11 is also referred to as a next hop processor due to this function. The switching fabric 15 redirects the representation of the received packets to an appropriate backplane port for receipt by a connected module, such as line card 1 or 4.

The modules connected to the backplane may have numerous different functions. In the present example, line card 1 is an interface allowing numerous computers to connect to the router 10 through line card 1. Line card 4 is a device that encrypts and decrypts traffic to and from line card 1.

As an example flow of packets through the router 10, traffic from the Internet travels through CPU 11, along a bus 6 to switching fabric 15. From the switching fabric 15, the packets travel to line card 4 for encryption, then back through the switching fabric 15 to the line card 1 for delivery to one of the numerous attached computers (not shown). In the reverse direction, traffic flows from one of the numerous attached computers, through line card 1, through the switching fabric 15 to the line card 4 for decryption. The packets then travel back through the switching fabric 15 and over the bus 6 to CPU 11 for forwarding over the Internet. As the example flow of packets demonstrates, traffic flow through the switching fabric can often be multiplied. The conventional use of congestion messages sent through the switching fabric 15, in band with the packet flow, can lead to deadlock or packet loss when there is congestion in the switching fabric 15.

Figure 2:
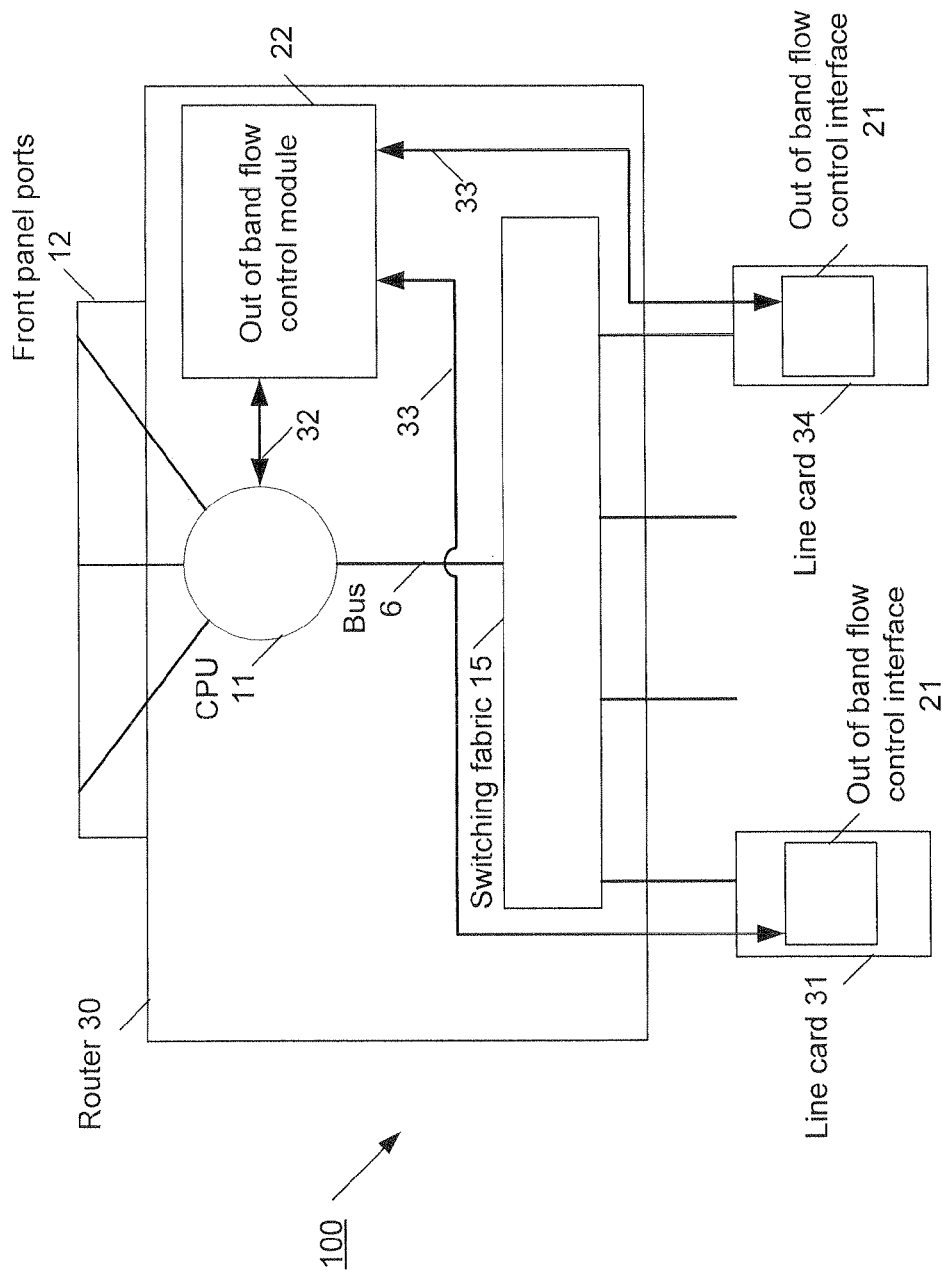
FIG. 2 illustrates an example system for providing out of band flow control for a router.

FIG. 2 illustrates an example system for providing out of band flow control for a router.

Several differences are immediately apparent when comparing FIGS. 1 and 2. First, the router 30 includes an out of band flow control module 22. The module 22 exchanges out of band flow control communications 33 with connected modules such as line cards 31 and 34. The flow control communications 33 are exchanged directly between the module 22 and the interfaces 21 and independently of switching fabric 15, the bus 6 and the CPU 11. In other words, the flow control communications 33 are exchanged out of band with respect to the traffic flow to and from the Internet. The physical location of the module 22 shown in FIG. 2 is not intended to limit the location of the module 22 in other embodiments, for example, the module can even be located in a "master" line card connected to a backplane of router 30.

Second, each of the line cards 31 and 34 include a flow control interface 21 for communicating with the module 22. These interfaces 21 allow the line card 31 to observe whether the line card 34 is congested (and vice versa) regardless of how much congestion is present in the switching fabric 15, the bus 6 and the CPU 11. When congestion is observed in a peer device, the interface 21 sends a local interrupt that triggers the CPU 11 to throttle traffic flow to that peer device. The number of line cards having interface 21 shown in FIG. 2 is not intended to be limiting, in other embodiments any number of line cards having interface 21 can be attached to the router 30.

Third, the CPU 11 and the module 22 exchange interrupt communications 32 directly. This allows the module 22 to throttle traffic from the CPU 11 to a congested line card. Thus, the system 100 can immediately throttle back traffic flow received from both the Internet and attached line cards when a congested line card is observed.

The above differences offer many benefits. One benefit includes, the router 30 does not suffer from deadlock or packet loss as does the router 10 shown in FIG. 1. Also, since the line cards 31 and 34 can quickly exchange congestion communications regardless of an amount of traffic on the switching fabric 15, the line cards 31 and 34 do not need to be configured with as many expensive queuing resources, e.g. memory, as the line cards 1 and 4 shown in FIG. 1. In other words, line card 34 can immediately throttle incoming traffic regardless of the state of the switching fabric 15. Therefore, line card 34 is less likely to drop packets than line card 4, even with less memory to buffer queued incoming communications. Thus, the line cards 31 and 34 can be produced less expensively than the line cards 1 and 4 shown in FIG. 1.

Figure 3:
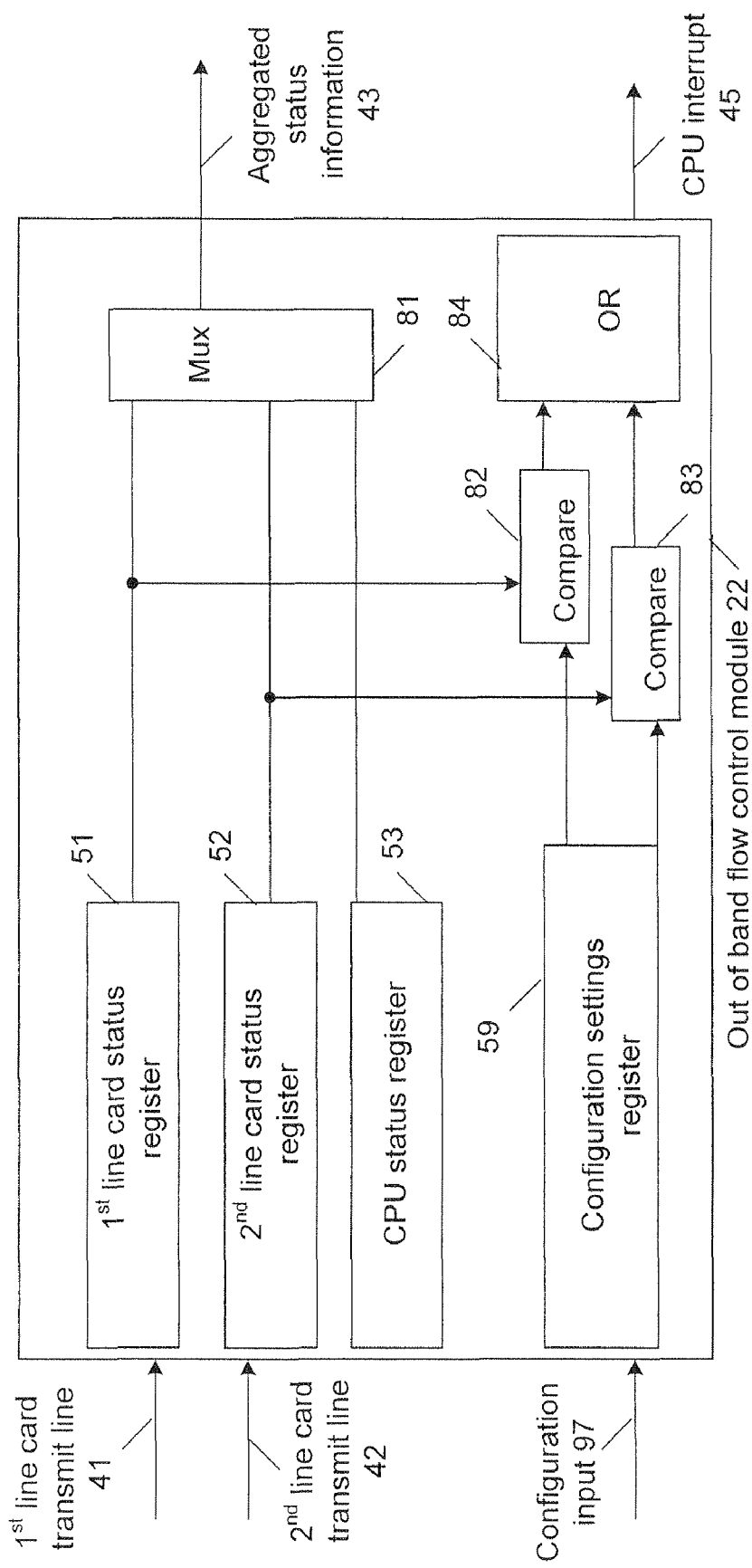
FIG. 3 illustrates an example of a flow control module for use in the example system illustrated in FIG. 2.

FIG. 3 illustrates an example of a flow control module for use in the example system illustrated in FIG. 2.

The module 22 generally aggregates queue status information from every device attached to the router 30 and broadcasts that information to all attached devices. Although the module 22 is located in the router 30 in the present example, in other examples the module 22 may be located in one of the devices attached to the router 30.

The module 22 includes line card status registers 51 and 52 that store status information received from attached devices over the transmit lines 41 and 42. In the present example, register 51 stores status information for line card 31 and register 52 stores status information for line card 34. Although the module 22 is illustrated as having only two of the line card status registers in the present example for brevity, in other examples the module 22 includes one status register for each device attached to a backplane port of the router 30.

The module 22 may also include a register 53 for tracking the congestion status of the CPU 11 for the router. The congestion status of the CPU 11 is published to interfaces within the attached line cards in the aggregated status information 43.

In the present example different transmit lines 41 and 42 are shown for different attached line cards. Other examples include a single serial transmit line connected to the module 22. When the single transmit line is used, each attached device is assigned a predetermined time slot allowing the module to correlate received status information to a particular attached line card by observing a clock. A separate line or a gapped clock on the same line may be used for synchronization when this timing scheme is used. In yet other examples, other methods of correlating received status information to attached line cards may be used besides the timing scheme or separate transmit lines.

In the present example, the status information stored in each of the registers 51 and 52 includes eight bits, where each bit represents the status of a particular queuing resource on a respective attached line card. In other words, the line cards 31 and 34 each have eight queues (e.g. multiple queues per endpoint) that can be consumed before exhausting queuing resources. In other examples, the attached devices such as line cards 31 and 34 have different amounts of queues and, accordingly, the registers 51 and 52 have different amounts of bits. In other words, in this example, eight bit communications are received on the line card transmit lines 41 and 42 identifying which corresponding resources on the line cards 31 and 34 are filled up. Likewise, the register 53 includes a number of bits that corresponds to queuing resources for the CPU 11.

The module 22 also includes a configuration settings register 59 that is configurable by configuration input 97. In the present example, input 97 is connected to the CPU 11 of the router 30 to allow for user configuration of the register 59. The settings stored in the register 59 specify which bit position for each of the eight bits stored in each of the registers 51 and 52 should be observed to identify a congested line card. For example, the register 59 can be set so that only the first of the eight bits stored in the register 51 is observed with respect to line card 31. This setting will result in the module 22 identifying congestion for line card 31 only when the queuing resource corresponding to that bit is filled. Such a setting will not indicate congestion in the remote line card when other queuing resources are filled. The register 59 can be configured so that any other bits can be observed so that congestion is identified only when corresponding queues targeted for observation are filled up.

The register 59 may either be large enough to accommodate separate settings for each of the line cards, or the settings may be distributed across any number of registers. The bit settings stored on the register 59 may be referred to as a configuration file.

In operation, the module 22 performs two general operations. As the first operation, the module 22 uses MUX 81 to combine the status information in each of the registers 51, 52 and 53. The aggregated status information 43 is then transmitted to each attached device, e.g. line cards 31 and 34 in the present example. A timing scheme or any other method may be used so that the interfaces 21 in the line cards 31 and 34 are able to identify how the status information corresponds to their peer devices.

The second operation is to identify congestion to the CPU 11 for the router 30. The comparison elements 82 and 83 are used to compare the status information in each register 51 and 52 to respective setting information stored in register 59. When an output of the OR gate 84 identifies congestion, a CPU interrupt 45 is sent to the CPU 11 of the router 30. The CPU interrupt 45 causes the CPU 11, to reduce or stop packet flow directed to the line card specified in the interrupt 45. Packet flow may be reduced by dropping packets or by any other method. A sticky bit in the module 22 is released when the congestion is resolved, which in turn updates the CPU 11 that the particular line card is no longer congested.

Importantly, the interrupt 45 is sent out of band with respect to the switching fabric 15 of the router 30. As a result, the CPU 11 is immediately notified of the interrupt regardless of congestion in the switching fabric 15 of the router 30.

Figure 4:
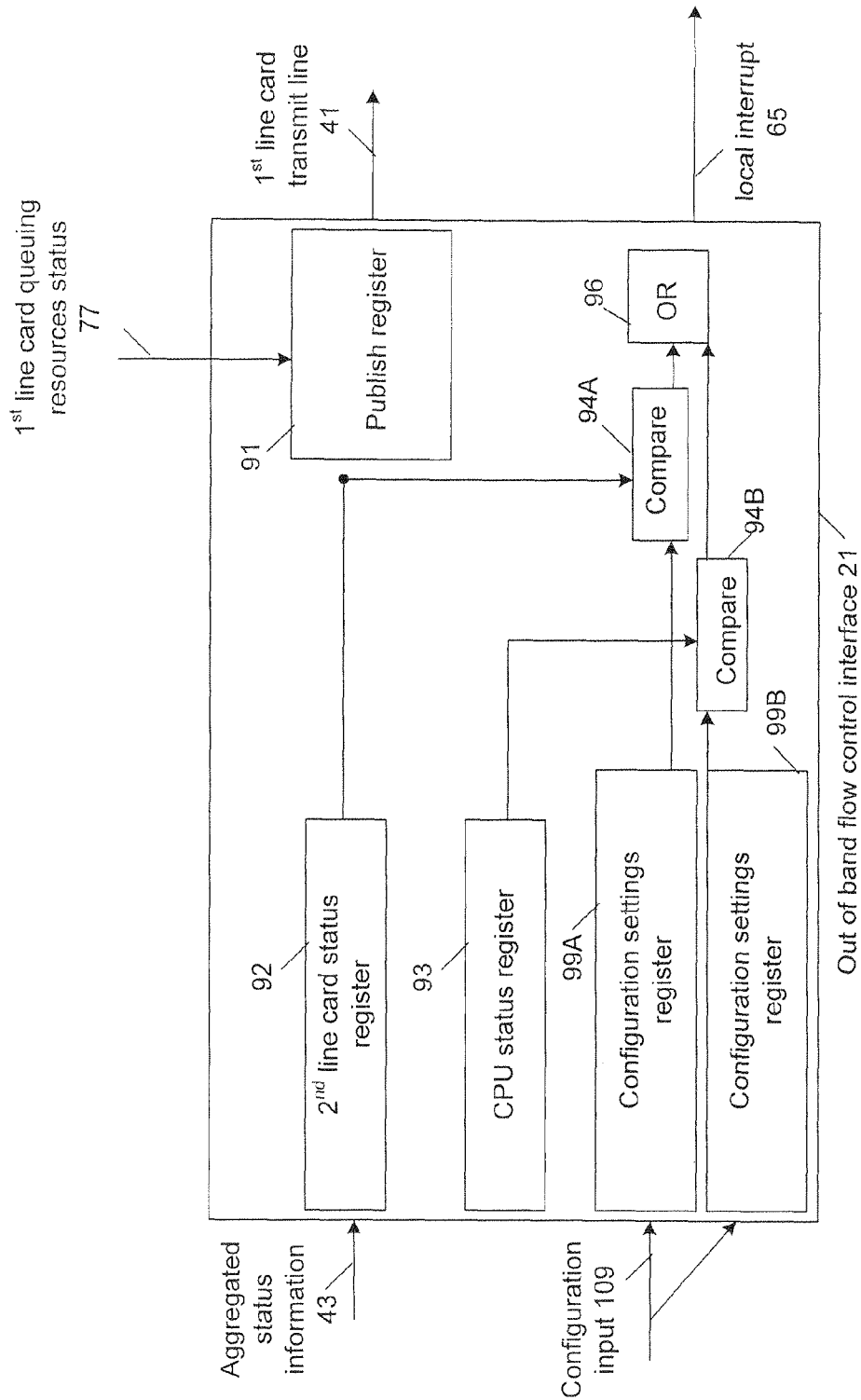
FIG. 4 illustrates an example of a flow control interface for use in the example system illustrated in FIG. 2.

FIG. 4 illustrates an example of a flow control interface for use in the example system illustrated in FIG. 2.

The interface 21 included in line card 31 receives the aggregated status information 43 so that the queuing resources for line card 34 and CPU 11 can be locally monitored. The interface 21 also uses transmit line 41 to send status information for local queuing resources to the module 22 for aggregation and distribution to the other line cards such as line card 34.

Importantly, the line card transmit line 41 and a line providing the aggregated status information 43 are out of band with respect to the switching fabric 15 and the CPU 11 (FIG. 2). Thus, status information for line card 31 is immediately broadcast to other line cards and aggregated status information 43 is immediately received by line card 31 regardless of congestion in either the switching fabric 15 or the CPU 11.

The line card status register 92 stores eight bits representing the status of the queuing resources located on line card 34. In other examples when more line cards are attached, other line card status registers may be included to monitor the status of any other devices attached to the router 30. In other words, there may be one of the registers 92 to correspond with every device attached to the router. The CPU status register 93 likewise stores bits representing a state of queuing resources located on the CPU 11.

The configuration settings registers 99A and 99B are updatable using a communication 109 from transferred from the CPU 11 over the out of band connection to the interface 21. Any other method of allowing a user to specify the configuration settings may be used. The settings stored in the register 99A specify which bit position indicates congestion for each of the eight bits stored in register 92. For example, the register 99A can be set so that only the first of the eight bits stored in the register 92 is observed. At the same time, the register 99B can be set so that a different subset of bits may be observed with respect to the bits stored in register 93.

To identify a queuing resource congestion in another attached device, the status information included in register 92 is compared to the settings in register 99A that correspond to the line card 34 by compare element 94A. Similarly, a comparison of the status information included in register 93 to the settings in register 99B by compare element 94B also controls the local interrupt 65. When either comparison identifies congestion in the queuing resources of a remote peer device, the OR gate 96 triggers the transfer of a local interrupt 65 to the line card 31. This local interrupt 65 notifies the line card 31 containing the interface 21 that traffic sent to a remote peer device should be throttled to avoid further congesting that peer device.

The interface 21 receives a line card queuing resources status 77 from the line card 31. This status 77 is stored in publish register 91 and then sent to the module 22 for aggregation using the line card transmit line 41.

Although the example interface 21 is discussed as being included on an attached line card, it should be understood that the interface 21 can be included on any other devices. For example, the interface 21 could be included on coprocessors on the router main card or plug-in cards that do not have external interfaces.

Figure 5:
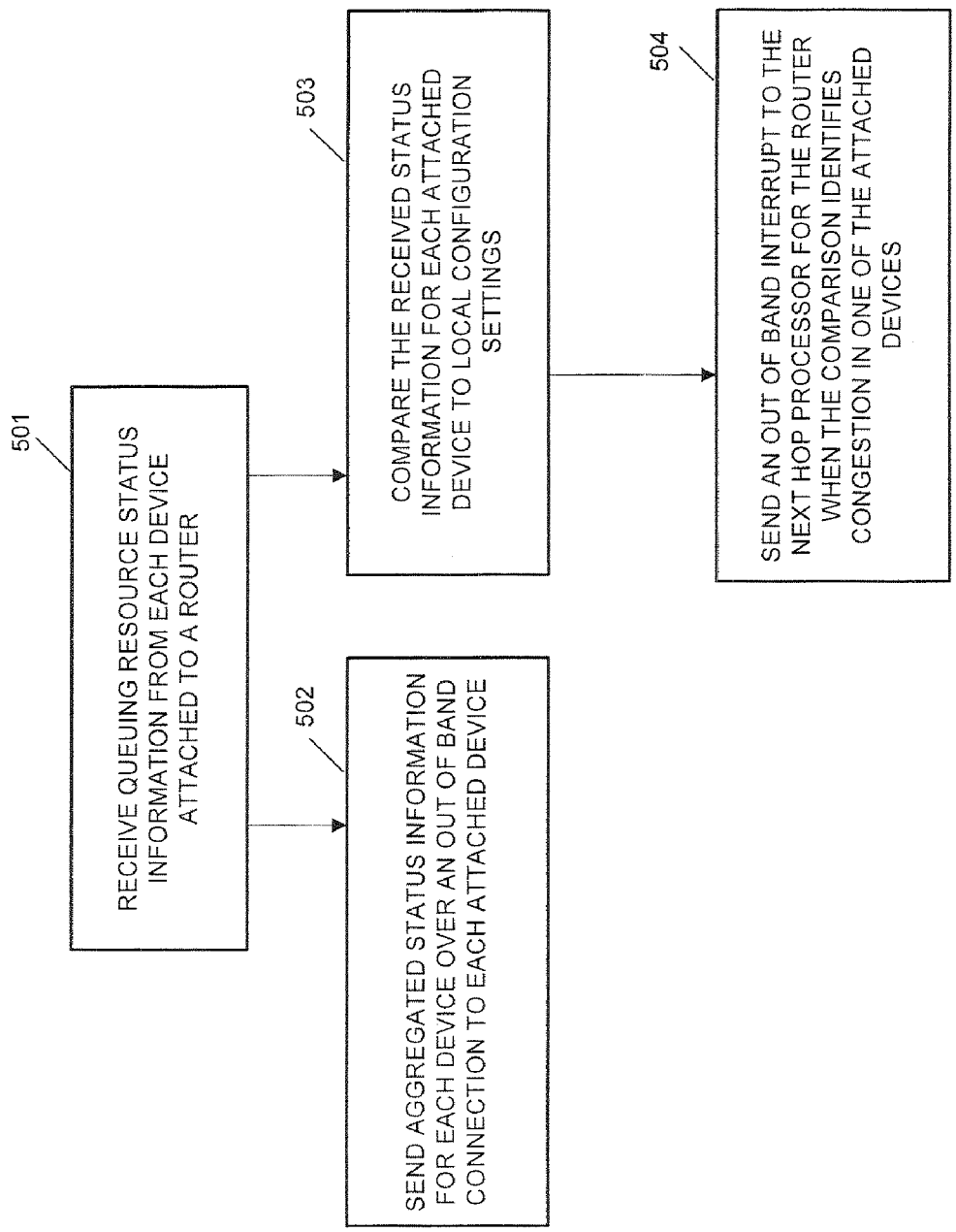
FIG. 5 illustrates an example method for out of band flow control using the flow control module illustrated in FIG. 3.

FIG. 5 illustrates an example method for out of band flow control using the flow control module illustrated in FIG. 3.

In block 501, the module 22 receives queuing resource status information from each device attached to a router. The module 22 aggregates the status information and sends the aggregated status information to each attached device in block 502. Accordingly, every device attached to switching fabric of the router receives the congestion status of every other device, allowing each of these attached devices to monitor the status of the remaining attached devices.

In block 503, the module 22 compares the received status information for each attached device to local configuration settings. When the comparison identifies congestion in one of the attached devices, the module 22 sends an out of band interrupt to a next hop processor for the router in block 504. The interrupt may identify the congested attached device and request either throttled traffic or halted traffic to that congested device.

Figure 6:
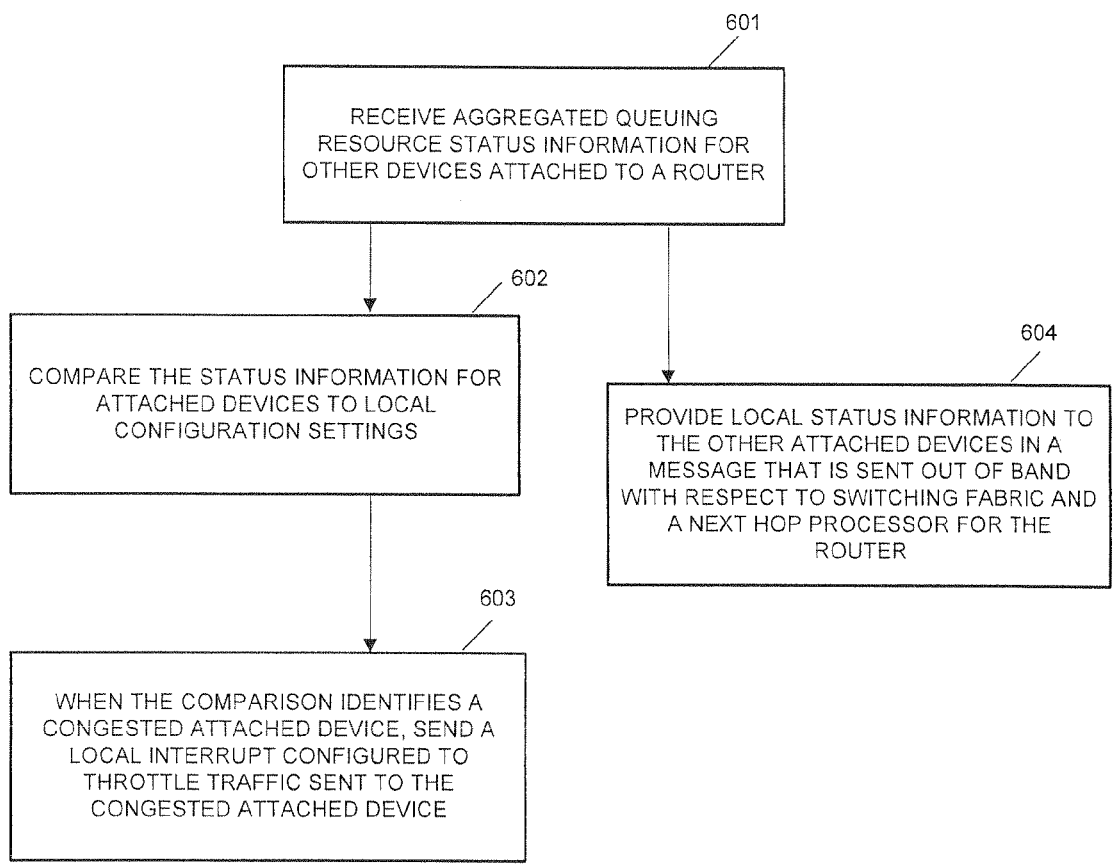
FIG. 6 illustrates an example method for out of band flow control using the flow control interface illustrated in FIG. 4.

FIG. 6 illustrates an example method for out of band flow control using the flow control interface illustrated in FIG. 4.

In block 601, the interface 21 receives aggregated queuing resource status information for devices attached to a router. The interface 21 compares the status information for each attached device to local configuration settings in block 602. When the comparison identifies a congested attached device, the interface 21 sends a local interrupt configured to throttle local traffic sent to the congested device in block 603. When the congestion has cleared, all devices will receive that status change and can resume normal data traffic.

In block 604, the interface 21 provides local queuing resource status information to other attached devices by sending an out of band status message. For example, with respect to FIG. 2, the status message 33 is sent independently of a next hop processor 11 for the router 30, switching fabric 15 for the router 30 and of a bus 6 used to transfer remotely addressed packets between the next hop processor 11 and the switching fabric 15.

Although the above described flow control scheme is described with reference to a router, other embodiments of the flow control scheme work with any packet processing device such as a switch or a gateway.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method, comprising:
    receiving a first queuing status message, the received first queuing status message indicating a queuing resource utilization for a first network device coupled to a packet processing device that exchanges information between first and second networks;
    receiving a second queuing status message, the received second queuing status message indicating a queuing resource utilization for a second network device coupled to the packet processing device;
    accessing a mapping that correlates each of the network devices to a predetermined time slot, wherein each of the predetermined time slots is set at a different amount of time after a reference than the other predetermined time slots;
    sending a group of queuing status messages to indicate a current queuing status of the first and second network devices as specified by the queuing resource utilization indications, wherein each of the queuing status messages of the group is sent at a different time according to the mapping;
    pausing queuing status transmissions to cause the first and second network devices to observe a transmission gap;
    sending a next group of queuing status messages according to the mapping to indicate a current queuing status of the first and second network devices as specified by the queuing resource utilization indications and any subsequently received queuing resource utilization indications, wherein each of the queuing status messages of the next group is sent a different amount of time later than said transmission gap according to the mapping; and
    continuously repeating said transmission pausing and said sending of a next group of queuing status messages;
    wherein the queuing status messages are sent to the first and second network devices out of band with respect to packets traveling from the first network through the packet processing device to the second network, and wherein a physical line that is used for transmitting the queuing status messages is also used for synchronization signaling using said transmission gap.

2. The method of claim 1, wherein the queuing status messages are transferred over a different path than the packets traveling through the packet processing device.

3. The method of claim 1, further comprising:
    comparing the queuing resource utilization indication for the first network device to a local configuration file; and
    sending an interrupt to a next hop processor in the packet processing device, the interrupt configured to cause the next hop processor to throttle an amount of packet traffic that is forwarded to the first network device.

4. The method of claim 3, wherein the local configuration file identifies a queuing resource utilization threshold to trigger the interrupt.

5. The method of claim 3, wherein the local configuration file specifies different queuing resource utilization thresholds for the first and second network devices.

6. The method of claim 3, wherein at least one of the queuing status messages is sent independently of switching fabric that connects the next hop processor to backplane ports for the packet processing device, the switching fabric used for switching backplane destinations for the packets traveling from the first network through the packet processing device to the second network.

7. The method of claim 1, wherein the queuing status messages are sent to all devices attached to the packet processing device that exchanges information between the first and second networks.

8. An apparatus, comprising:
    a processor; and
    a memory coupled to the processor comprising instructions executable by the processor, the processor operable when executing the instructions to:
    receive a first queuing status message, the received first queuing status message indicating a queuing resource utilization for a first network device coupled to a packet processing device that exchanges information between first and second networks;
    receive a second queuing status message, the received second queuing status message indicating a queuing resource utilization for a second network device coupled to the packet processing device;
    access a mapping that correlates each of the network devices to a predetermined time slot, wherein each of the predetermined time slots is set at a different amount of time after a reference than the other predetermined time slots;
    send a group of queuing status messages to indicate a current queuing status of the first and second network devices as specified by the queuing resource utilization indications, wherein each of the queuing status messages of the group is sent at a different time according to the mapping;
    pause queuing status transmissions to cause the first and second network devices to observe a transmission gap;
    send a next group of queuing status messages according to the mapping to indicate a current queuing status of the first and second network devices as specified by the queuing resource utilization indications and any subsequently received queuing resource utilization indications, wherein each of the queuing status messages of the next group is sent a different amount of time later than said transmission gap according to the mapping; and
    continuously repeat said transmission pausing and said sending of a next group of queuing status messages;
    wherein the queuing status messages are sent to the first and second network devices out of band with respect to packets traveling from the first network through the packet processing device to the second network, and wherein a physical line that is also used for transmitting the queuing status messages is used for synchronization signaling using said transmission gap.

9. The apparatus of claim 8, wherein the first network device comprises a plurality of local queues, each of the local queues represented by one status bit of the first queuing status message.

10. The apparatus of claim 8, wherein the queuing status messages are sent to at least one of the network devices independently of packet processing device switching fabric that carries packets having a remote physical destination address different than a local physical address for the packet processing device.

11. The apparatus of claim 8, wherein at least one of the queuing status messages is sent through a backplane port of the packet processing device.

12. The apparatus of claim 8, wherein the queuing status messages are transferred over a different path than the packets traveling through the packet processing device.

13. The apparatus of claim 8, wherein the processor is further operable to:

compare the queuing resource utilization indication for the first network device to a local configuration file; and send an interrupt to a next hop processor in the packet processing device, the interrupt configured to cause the next hop processor to throttle an amount of packet traffic that is forwarded to the first network device.

14. The apparatus of claim 13, wherein the local configuration file identifies a queuing resource utilization threshold to trigger the interrupt.

15. The apparatus of claim 14, wherein the local configuration file specifies different queuing resource utilization thresholds for the first and second network devices.

16. The apparatus of claim 13, wherein at least one of the queuing status messages is sent independently of switching fabric that connects the next hop processor to backplane ports for the packet processing device, the switching fabric used for switching backplane destinations for the packets traveling from the first network through the packet processing device to the second network.

17. The apparatus of claim 9, wherein the queuing status messages are sent to all devices attached to the packet processing device that exchanges information between the first and second networks.

* * * * *